C. E. BORING.
TRACTOR.
APPLICATION FILED AUG. 18, 1915.

1,203,304.

Patented Oct. 31, 1916.
8 SHEETS—SHEET 2.

Charles E. Boring
INVENTOR.

BY

ATTORNEYS.

C. E. BORING.
TRACTOR.
APPLICATION FILED AUG. 18, 1915.
1,203,304.
Patented Oct. 31, 1916
8 SHEETS—SHEET 3.
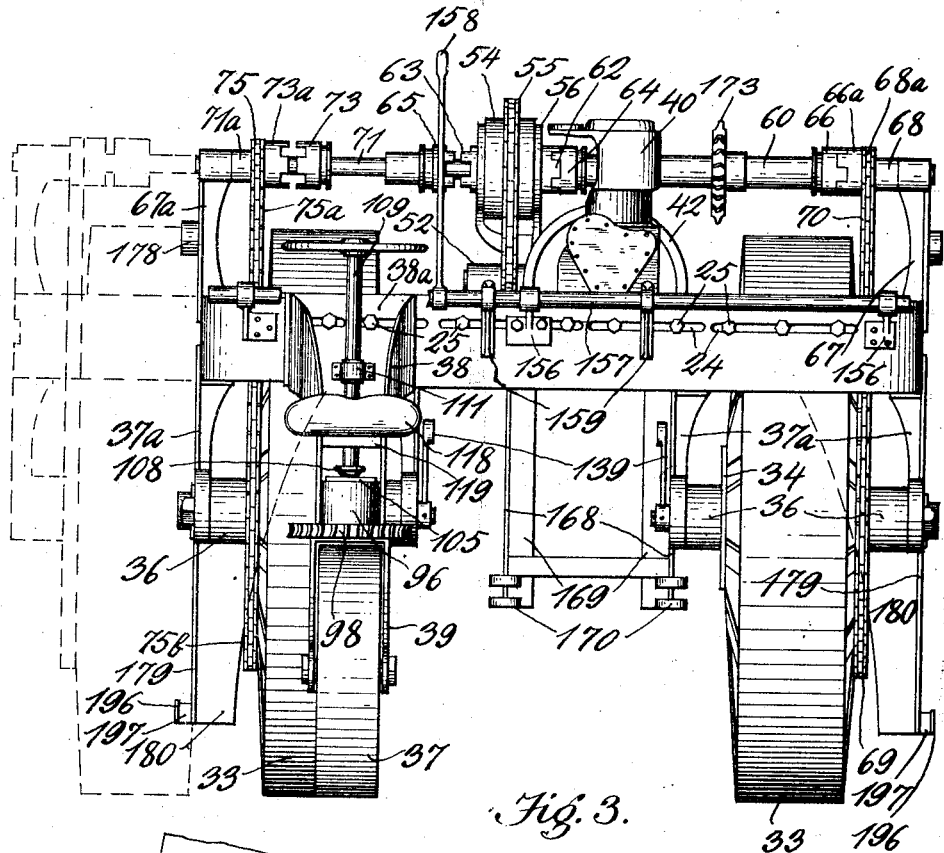
Fig. 3.
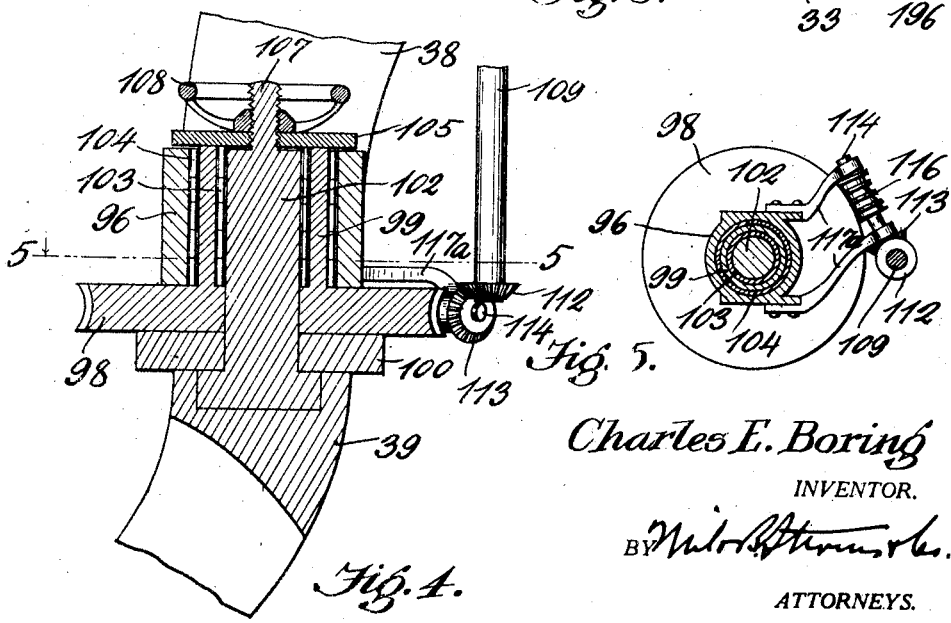
Fig. 4.
Fig. 5.
Charles E. Boring
INVENTOR.
BY
ATTORNEYS.

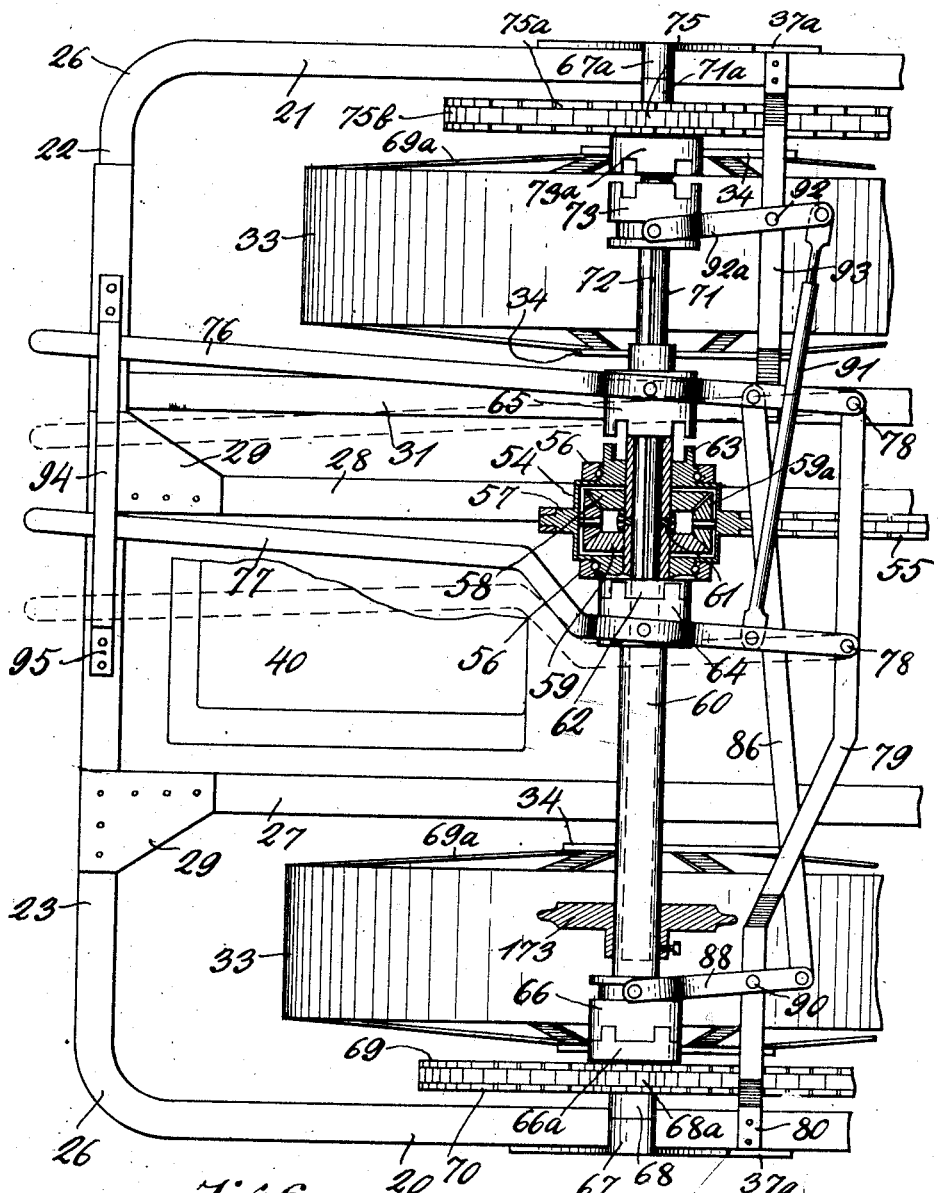

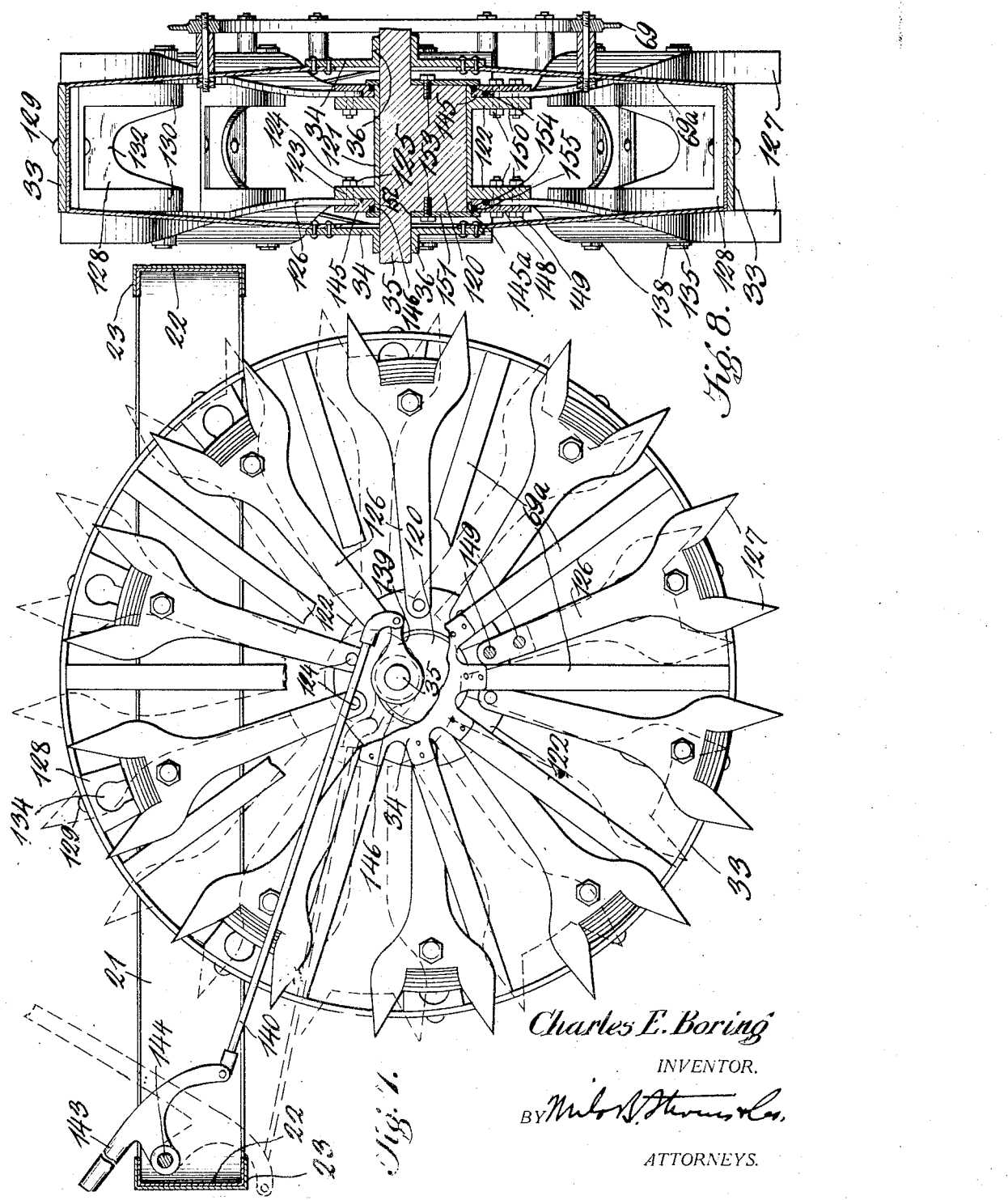

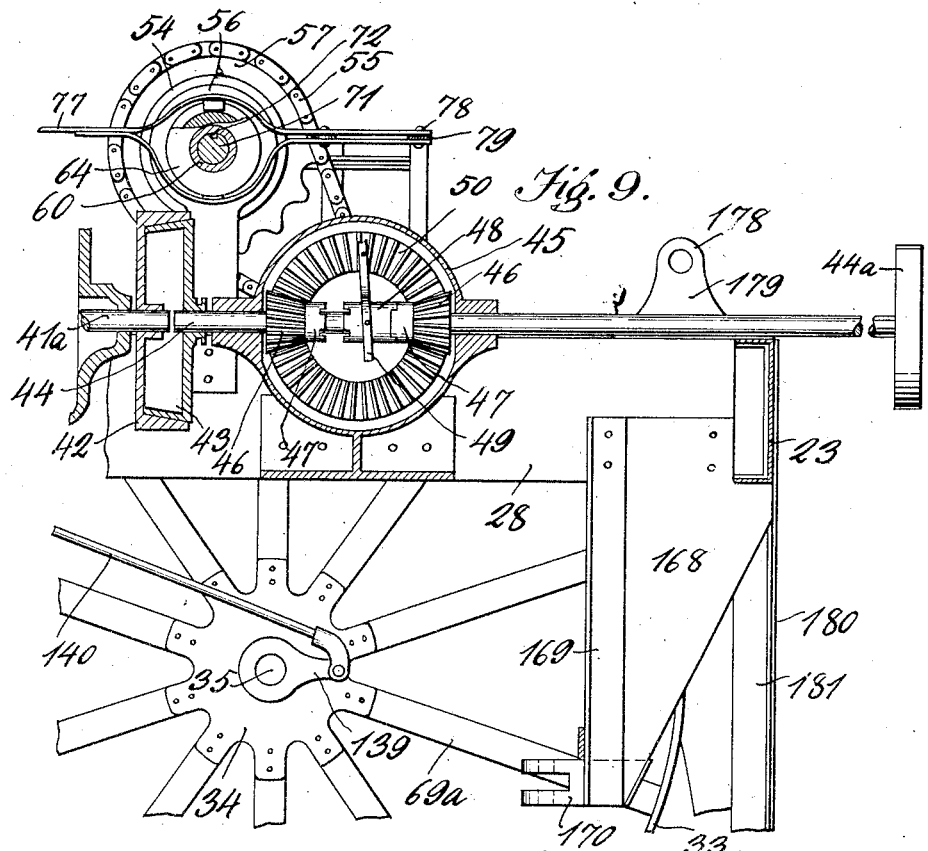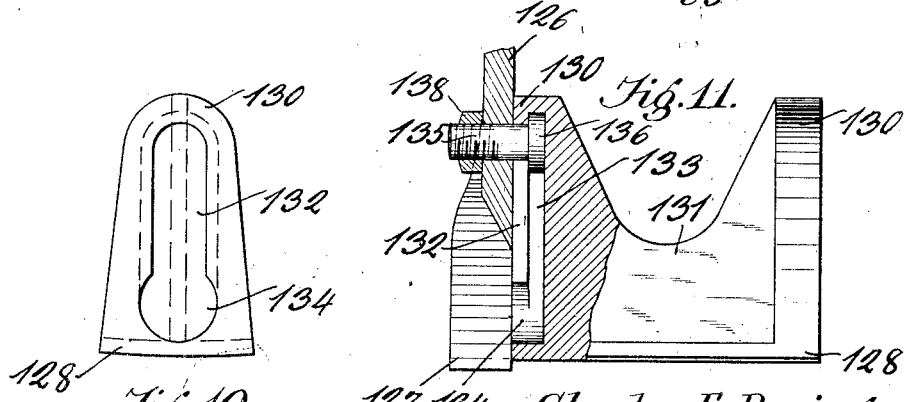

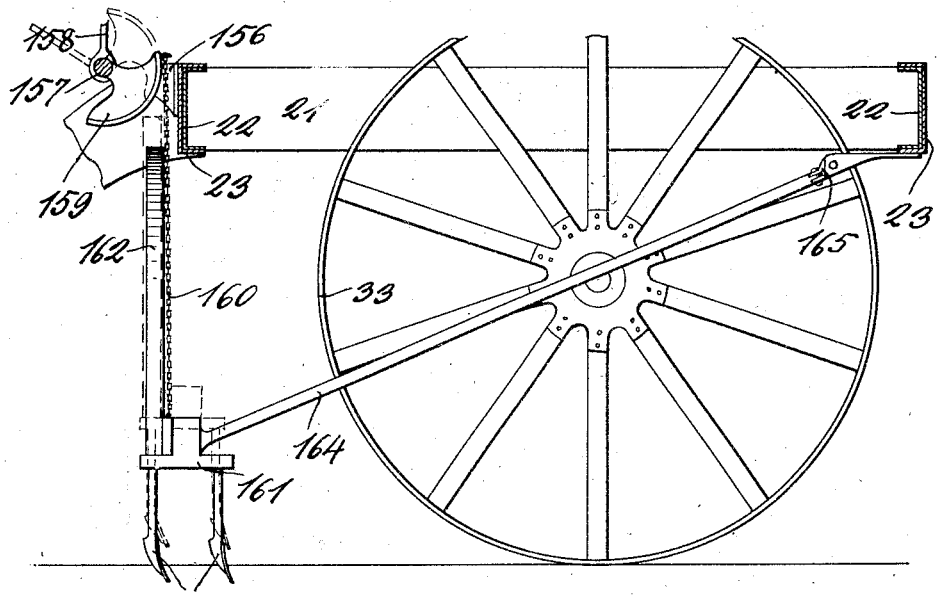
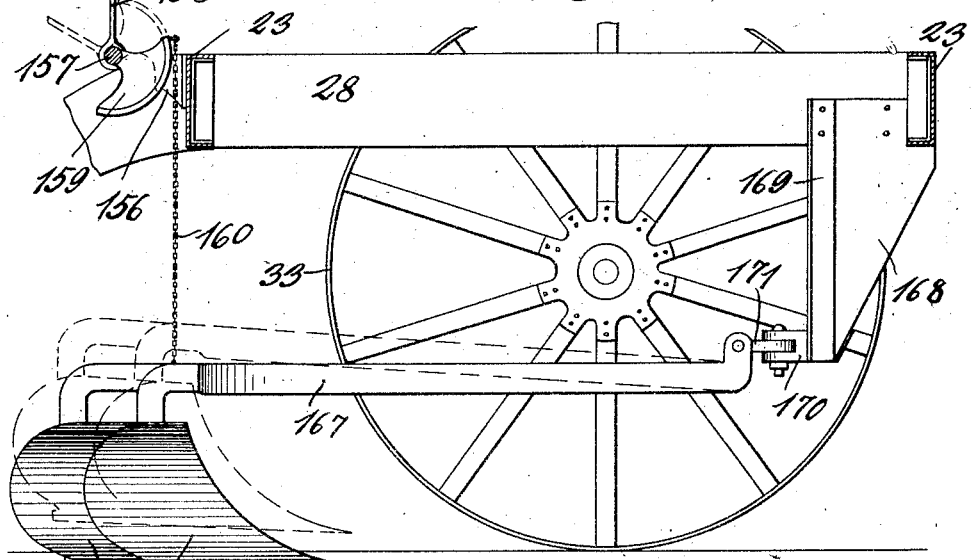

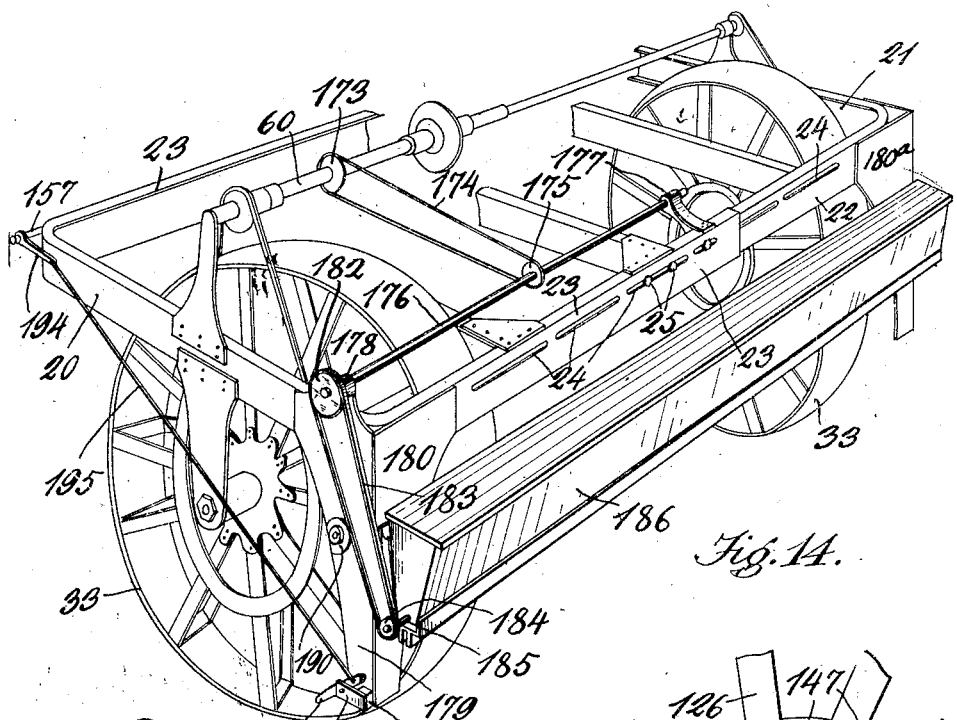
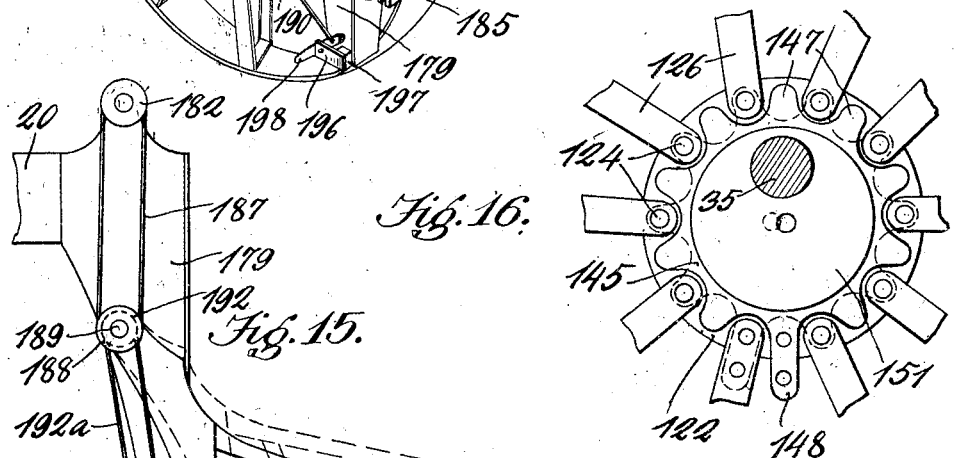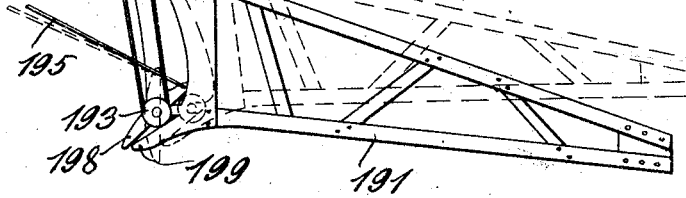

UNITED STATES PATENT OFFICE.

CHARLES E. BORING, OF CHICAGO, ILLINOIS, ASSIGNOR TO BORING TRACTOR COMPANY, A CORPORATION OF SOUTH DAKOTA.

TRACTOR.

1,203,304.   Specification of Letters Patent.   Patented Oct. 31, 1916.

Application filed August 18, 1915. Serial No. 46,160.

*To all whom it may concern:*

Be it known that I, CHARLES E. BORING, a citizen of the United States, residing at Chicago, in the county of Cook and State of Illinois, have invented certain new and useful Improvements in Tractors, of which the following is a specification.

This invention relates to improvements in agricultural tractors, and it is the object of the invention to provide a machine which is adapted for various operations on the farm. The machine is self-propelled, has means for turning to various positions, and also other means whereby any of the ordinary farm implements separately used may be attached. With this universal application, the machine may be operated at all seasons, thus obviating the cost and maintenance of separate vehicles carrying the individual implements.

In order that the invention may be better understood, reference is had to the accompanying drawings, in which—

Figure 1:
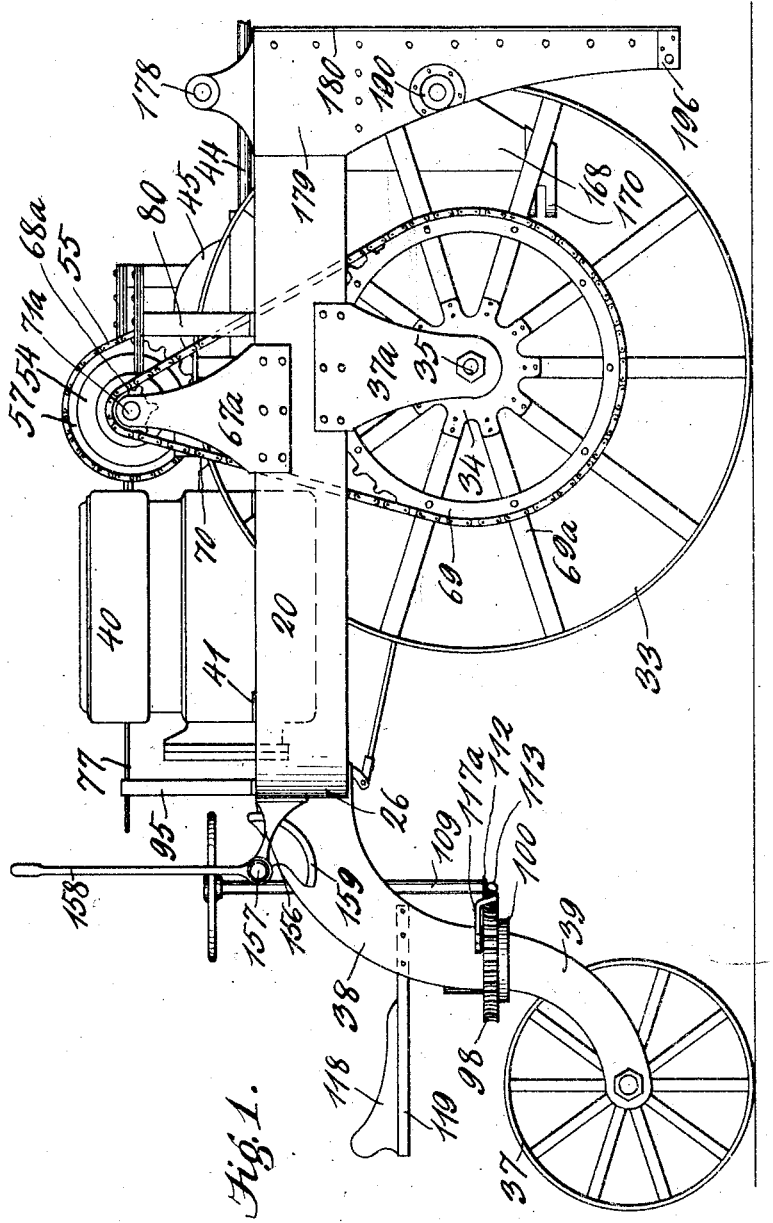
Figure 2:
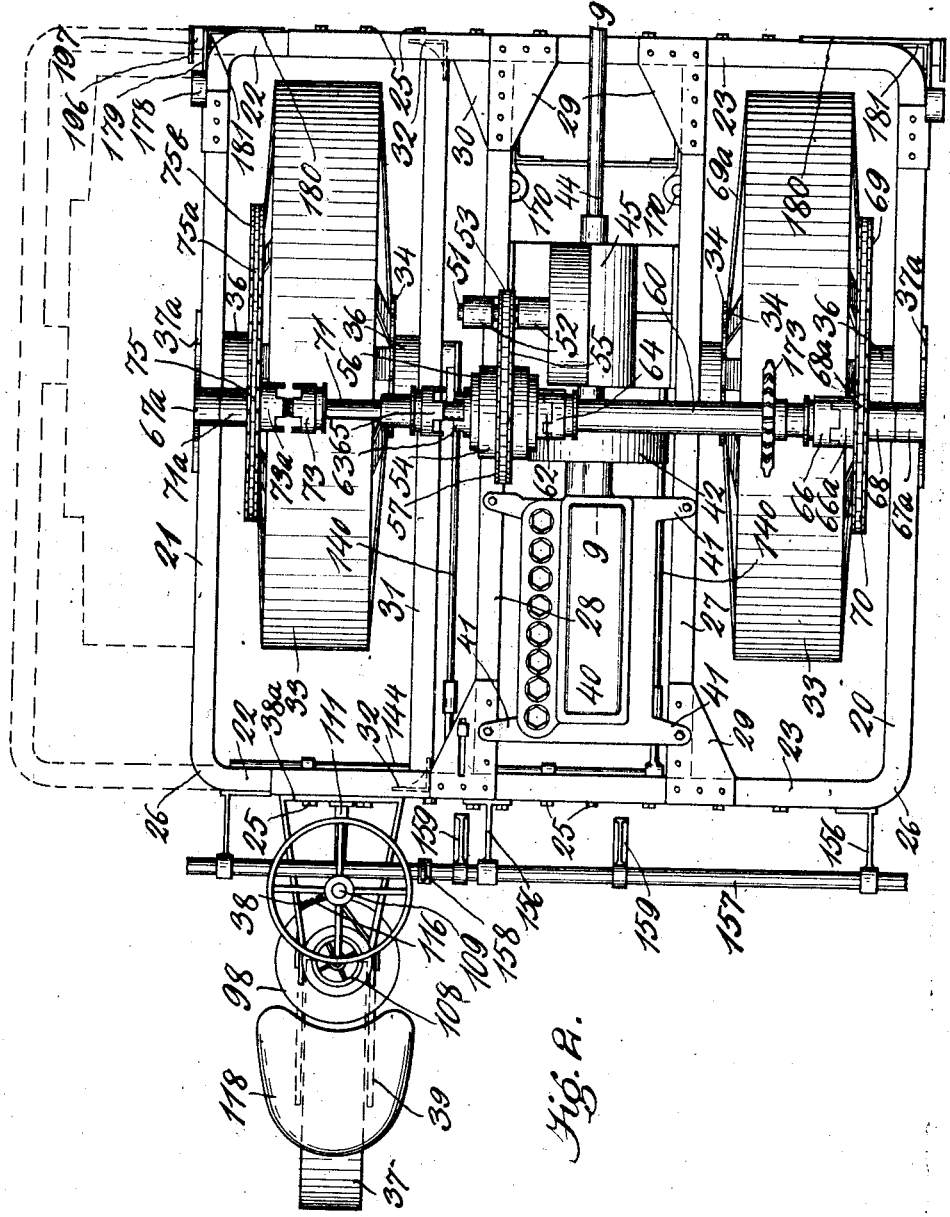

Figure 1 is a side elevation of the machine; Fig. 2 is a plan view thereof with certain parts removed; Fig. 3 is a rear end view of the machine; Fig. 4 is a vertical section of a steering mechanism; Fig. 5 is a horizontal section on the line 5—5 of Fig. 4; Fig. 6 is a plan view of a fragment of the machine showing more particularly the driving gear of the traction wheels and the means for controlling the same, certain parts being shown in section; Fig. 7 is a side elevation, partly broken away, of one of the traction wheels; Fig. 8 is a vertical section of said wheel; Fig. 9 is a sectional detail on the line 9—9 of Fig. 2; Fig. 10 is an elevation of a support for one of the traction spurs of the traction wheel; Fig. 11 is a side elevation of said support, partly in section; Fig. 12 is an elevation of a portion of the machine showing the application of a cultivator attachment thereto; Fig. 13 is a similar view showing the application of a plow attachment; Fig. 14 is a perspective view of a portion of the machine, illustrating a seeding attachment, and a controlling means for a binder attachment; Fig. 15 is a side elevation of a fragment of the machine showing the application of a binder attachment thereto, and Fig. 16 is a detail showing a means for mounting the inner ends of the traction spurs.

Referring specifically to the drawings, the frame of the machine is of channel steel and substantially rectangular in shape, it being composed of two laterally adjustable sections 20 and 21, respectively, each section comprising a longitudinal side bar having inward bends. The channels face inward, and the bends 22 of the section 21 are slidable in the channels of the bends 23 of the section 20, thus enabling the frame to be widened as shown dotted in Figs. 2 and 3. The bends 22 and 23 have registering longitudinal slots 24 to receive bolts 25, whereby the two frame sections are fastened together in adjusted position. The corners of the frame are rounded as shown at 26. The frame section 20 is reinforced by two longitudinal channel bars 27 and 28 which are laterally spaced, with the channels facing outward. These bars extend longitudinally between the bends 23 and they are secured to the latter by gusset plates 29. The frame section 21 is also reinforced by a longitudinal channel bar 31 extending between the bends 22 and seating at its ends in the channels of said bends, and secured therein by angle brackets 32 secured by countersunk bolts.

Slightly forward of the middle of the frame are located the traction wheels 33 of the machine. One of these wheels is located between the side bar of the frame section 20 and the longitudinal bar 27, and the other wheel is located between the side bar of the frame section 21 and the longitudinal bar 31.

The hub of each wheel comprises two laterally spaced disks 34 having each a hub extension 36 to receive an axle 35 supported by bearing brackets 37ª. The frame section 20 carries the bearing brackets of one of the axles, and the bearing brackets of the other axle are carried by the other section of the frame to permit the lateral adjustment of said sections as hereinbefore described, one of the traction wheels being carried by one of the frame sections, and the other traction wheel by the other frame section. The machine is also provided with a steering wheel 37 located to the rear of the traction wheels 33 and behind the frame of the machine. This wheel is supported by an arched bracket 38 having its forward end 38ª slotted and secured to the rear bend 23 of the frame section 21 by two of the bolts 25 hereinbefore mentioned. The bracket also has a separate bottom section 39 which carries the wheel 37.

Near the rear ends of the longitudinal bars 27 and 28 is mounted the power source of the machine, the same being preferably an internal-combustion engine 40. The base arms 41 of the engine frame are bolted on top of the bars 27 and 28 as shown in Fig. 2, and suitable controlling devices and other accessories for the engine will be provided, these not being shown as they form no part of the present invention and are well understood by those skilled in the art. The engine shaft 41ª extends forwardly and is provided with a fly wheel 42, and associated with the latter is a cone clutch 43 of conventional type carried by a countershaft 44 which is in alinement with the engine shaft 41ª. The countershaft passes through a reverse gear set of the usual type and extends to the forward end of the frame where it has a pulley or other means 44ª for transmitting motion to any auxiliary machine, such as a grain separator, a pump or the like, that may be used on the farm.

The countershaft 44 is continuous and not severed at any place in the gear set, and on said shaft are loosely mounted two opposite bevel pinions 46, each of which is provided with a clutch member 47. Between these clutch members is located a sliding clutch member 48 having jaws at its ends so that it may be locked to either one of the clutch members 47. The clutch member 48 is mounted on the shaft 44 to rotate therewith, and it is controlled by the usual fork 49. The bevel pinions 46 are in mesh with a bevel gear 50 carried by a shaft 51 supported in bearings 52. The gear set is inclosed in a case 45. The motion of the countershaft 44 is transmitted to the shaft 51 through either one of the bevel pinions 46 and the bevel gear 50, the direction in which motion is transmitted depending on which one of the clutch members 47 is engaged by the clutch member 48.

On the shaft 51 is a sprocket wheel 53 connected by a chain 55 to a differential drive gear. This differential drive gear is of the conventional planetary type and consists of a housing 54 having a sprocket wheel 57 over which the chain 55 is trained, said sprocket wheel 57 being the master driving element of the gear. The housing 54 is journaled in a ball-bearing support 56 supported by the longitudinal bar 28. The differential has the usual two large bevel gears 58 and 59, and an annular series of bevel pinions 59ª carried by the housing 54. A hollow shaft 60 passes through the center of the differential housing, this shaft being severed on the longitudinal center line of the housing. Between the severed shaft ends is a ring 61 of bearing material which prevents end play of the shaft sections. The bevel gears 58 and 59 are made fast to the respective shaft sections.

The end walls of the differential housing 54 are formed with projecting clutch members 62 and 63, respectively, coöperating with clutch members 64 and 65, respectively, mounted on corresponding sections of the shaft 60. The clutch members 64 and 65 are splined or otherwise connected to the shaft sections to slide thereon, and also to transmit motion thereto.

That section of the shaft 60 which carries the clutch member 64 extends toward one side of the machine and carries at its outer end a clutch member 66 rotatable with and slidable on the shaft section. Adjacent to the clutch member 66 and in line therewith is a coöperating clutch member 66ª fast on a shaft 68 supporting a sprocket wheel 68ª. The shaft 68 is supported in a bearing stand 67 rising from the side bar of the frame section 20. The sprocket wheel 68ª is connected by a chain 70 with a sprocket wheel 69 carried by the traction wheel 33 of the frame section 20, the sprocket wheel 69 being fastened on the outer spokes 69ª of said wheel. Thus the motion of the shaft 60 is transmitted through the clutch members 66 and 66ª to the shaft 68, and by the sprocket wheel 68ª, chain 70 and sprocket wheel 69 to the traction wheel of the frame section 20.

The traction wheel 33 of the frame section 21 is driven from a shaft 71 slidably mounted in the shaft 60. The outer end of the shaft 71 has a slidable clutch member 73 similar to the clutch member 66, and coöperating with said clutch member 73 is a clutch member 73ª on a shaft 71ª supported by a bearing stand 67ª rising from the side bar of the frame section 21. On the shaft 71ª is a sprocket wheel 75 connected by a chain 75ª to a sprocket wheel 75ᵇ on the aforesaid traction wheel.

The shaft 71 has a key-way 72 for sliding connection with that section of the shaft 60 carrying the clutch member 65.

The shafts 60 and 71 and the differential assembly hereinbefore described provide a jackshaft in two telescoping sections, namely, the solid shaft 71 telescoping into the hollow shaft 60. The two-part telescoping shaft is necessary for the reason that the tractor frame sections 20 and 21 are adjustable laterally, and the arrangement of shafts permits motion to reach both wheels 33 when the frame is widened, the shaft being variable in length to permit adjustment of the frame.

The following means are provided for controlling the clutches hereinbefore described: To the clutch member 65 is operatively connected a hand lever 76, and to the clutch member 64 is operatively connected a hand lever 77. These hand levers extend rearwardly within easy reach of the operator, and they are located on opposite sides of the differential housing 54. The forward ends of the levers 76 and 77 are fulcrumed at 78 on the cross rail 79 of a stand 80 carried by the section 20.

In order that the levers 76 and 77 may also operate the clutch members 66 and 73, the following connections are provided: On the rail 79 is fulcrumed at 90 a yoke 88 operatively connected to the clutch member 66. The yoke 88 is connected by a link 86 to the lever 76. The frame section 21 carries a supporting stand 93 on top of which is fulcrumed, as indicated at 92, a yoke 92$^a$ operatively connected to the clutch member 73. The yoke 92$^a$ is connected to the lever 77 by a rod 91, the latter being made in two telescoping sections to permit the widening or lateral adjustment of the frame sections 20 and 21.

The operation of the clutches may be summarized as follows: When the levers 76 and 77 are separated at their rear ends, the clutch members 64 and 65 will be retracted or disengaged from the corresponding clutch members 62 and 63, and the clutch members 66 and 73 will be engaged with their coöperating clutch members 66$^a$ and 73$^a$. With the clutches in this position, the shafts 60 and 71 will be driven in the same direction, a differential drive being obtained, and said shafts will drive the traction wheels 33 through the sprocket and chain gearing hereinbefore described.

Upon bringing the rear ends of the levers 76 and 77 together, the clutch members 64 and 65 will be engaged with the clutch members 62 and 63, and the clutch members 65 and 73 will be disengaged from the clutch members 66$^a$ and 73$^a$, with the result that whatever motion is imparted to the jack-shaft assembly, none reaches the traction wheels 33. Hence, the machine will remain stationary; or, if it is desired to draw the machine away from its position, the wheels 33 will roll free and there will be no hindrance or dragging.

With the levers 76 and 77 positioned as shown in full lines in Fig. 6, the clutch member 64 is in engagement with the clutch member 62, and the clutch member 66 is engaged with the clutch member 66$^a$, the other clutch members being disengaged. The motion of the master driving member 57 of the differential will now be transmitted directly through the clutch members 62 and 64 to the shaft section 60 on which the clutch member 64 is mounted, independent of any differential action, and the traction wheels 33 will be driven by said shaft section 60, whereas the shaft 71 and the corresponding wheel 33 remain stationary as the clutch members 73 and 73$^a$ are disengaged, and the clutch member 65 is also disengaged from the clutch member 63. This will have the effect of turning the machine in place, with the last-mentioned traction wheel 33 as an axis. Similarly, by placing the levers 76 and 77 in the position shown dotted in Fig. 6, the reverse of this action is obtained.

The handle ends of the levers 76 and 77 pass through a double cross rail 94 forming the top of a stand 95 fastened to the rear bend 23 of the frame section 20.

The member 39 which supports the steering wheel 37 is a fork on the head of which is mounted a circular plate 100. The head of the fork also carries an upstanding pivot pin 102. While these parts might be made in one piece, it is preferable to have them separate, the pivot pin being of hardened steel and the fork and disk being of cast iron. On the pivot pin is loosely mounted a worm wheel 98 having projecting from its top face a hub 99 seating loosely in a bearing 96 at the bottom of the bracket member 38. The pivot pin 102 is fixed to the fork 39, and it passes loosely through the upstanding hub 99 of the worm wheel, said hub rising a short distance above the bearing 96. The upper end of the pivot pin has a reduced threaded shank 107 on which is mounted a disk 105, and above said disk a hand nut 108 is screwed on the shank, by means of which the disk may be clamped down on the upper end of the hub to couple the worm wheel to the pivot pin so that said parts turn together, and upon backing the hand nut, the worm wheel and the pivot pin are disconnected. Between the pivot pin and the inner periphery of the hub are interposed anti-friction rollers 103, and similar rollers 104 are interposed between the bearing 96 and the outside of the hub.

The rear frame bar 23 carries a bearing bracket 111 supporting a vertical steering post 109 provided with a hand wheel at its upper end. On the lower end of the steering post is a bevel gear 112 which is in mesh with a bevel gear 113 on a shaft 114 provided with a worm 116 meshing with the worm wheel 98. The shaft 114 is supported by brackets 117$^a$ carried by the bearing 96 of the bracket 38. By means of this worm gearing and the steering post, the wheel 37 is swung around to steer the machine when the disk 105 is clamped down on the hub 99 to couple the worm wheel 98 to the pivot pin 102. When the wheel 37 is not to be manipulated for steering, the hand nut 108 is backed, whereupon the worm wheel and the pivot pin are uncoupled, and the fork 39 carrying the wheel 37 is free to swivel, this being advantageous when the machine is to turn in place, or is to be drawn away from its position, the wheel thus acting freely as a caster wheel.

The seat 118 for the operator is supported on the bracket 38 by a platform 119.

The wheels 33 are provided with traction spurs or ground gripping devices illustrated in detail in Figs. 7, 8, 10 and 11. The axle 35 has an eccentric enlargement 120 located between the laterally spaced hubs 36. On the eccentric 120 is loosely mounted a hub 121 having outstanding annular end flanges 122. These flanges are apertured, as indicated at 123, to take a series of pins 124 in a circle, the heads of the pins projecting outwardly, and the shanks being threaded and secured by nuts 125. Over the heads of the pins are mounted the inner ends of the shanks 126 of a series of traction spurs projecting radially from the hub flanges 122 and having their outer ends arranged in a circle of the same diameter as that of the wheel 33. The outer ends of the shanks are gradually thickened and enlarged laterally and also here formed into a pair of chisel-shaped spurs 127, said spurs being located alongside the edges of the wheel rim. The shanks 126 pass from the hub 121 outward between the spokes 69ª of the wheel, and the spurs abut against the edges of the wheel rim and extend transversely thereof.

Between each pair of opposite shanks 126 is a block 128 which seats on the inner face of the rim of the wheel 33, and is fastened to said rim by rivets, bolts, or other means 129 which may be removed when desired. The block has two arched end portions 130 which are in contact with the inner faces of the shanks near their enlarged outer ends, said end portions being reinforced by a cross web 131. On the outer faces of the portions 130 is a radical slot 132 undercut to form a recess 133, both the slot and the recess having their ends rounded, and one end of the slot being enlarged as shown at 134, flush with the wall of the recess, 133 for a purpose to be presently described. A bolt 135, whose head 136 is slidably mounted in the recess 133 extends through the slot 132 and passes through the shank 126 near its outer end, said bolt being secured by a nut 138. The enlarged end 134 of the slot is designed to allow the insertion or removal of the bolt head 136 from the recess 133.

The operation of the traction spurs is as follows: With the eccentric 120 positioned as shown in Fig. 7, the hub 121 is in the lowest position of its path of motion, thus placing the traction spurs so that several of the same project below the rim of the wheel 33 should the latter begin to roll, the succeeding spurs also assuming this position at the bottom. With the spurs cutting into the ground a great amount of traction is obtained and at the same time the combined weight of the spurs will give the machine sufficient weight for the propulsion of heavy work implements. It will be noted that when the traction spurs are in ground gripping position at the bottom, the ones at the top of the wheel are flush with the rim. The spurs are drawn around with the wheel through the blocks 128 to which they are connected by the bolts 135, the slot 132 permitting a sliding movement of the spurs in the direction of their length, or radially. If the machine engages in an operation which requires weight, but does not necessitate the use of the traction spurs, the axle 35 may be turned 180 degrees and held there, the effect of this being a reversal of the eccentric 120, the same then being at its highest point. The traction spurs will now be projected when they are at the top of the wheel and retracted when at the bottom. Within the 180 degree radius the axle may be adjusted to various positions to advance or retract the spurs as desired.

To control the position of the axle 35 as hereinbefore described, a crank arm 139 is mounted thereon and connected by a rod 140 to a hand lever 143 fulcrumed on a shaft 144 which is hung within the rear frame bar 23. This lever is within the operator's reach and when it is drawn back the traction spurs are placed in operative position, and when pushed forward as shown dotted, the traction spurs are placed in inoperative position.

The inner ends of the shanks 126 are held to the flanges 122 by a device shown in Figs. 8 and 16, whereby they are prevented from dropping off the heads of the pins 124, said device being a circular plate 145 having a central opening 145ª to fit over the projecting end 146 of the hub 121. The rim of the plate is scalloped, as indicated at 147, to correspond to the number of shanks and to cover the inner ends thereof. The plate is held in this relation by radial extension 148 from which two bolts 149 pass through the inner ends of the corresponding shank 126, and through the flange 122, said bolts being secured by nuts 150. This fastening not only secures the plate 145 to the hub 121, but also rigidly secures one of the shanks to the latter by the two bolts 149. This fastening is necessary in order to give the shank assembly a fixed point on which to shift, the shank which is secured by the bolts 149 moving only in the direction of its length, while the others oscillate while being advanced and retracted.

An end plate 151 eccentrically apertured at 152 to receive the axle 35 covers the exposed portion of the plate 145 and the ends of the eccentric 120, said plate being secured to said ends by a bolt 153. The inner rim of the plate 145 is recessed, as shown at 154, to take a fabric washer 155. The plate 151 thus presses the plate 145 against the shanks 126, the pressure being cushioned by the washer 155.

The following means are provided for attaching a cultivator, plow or other implement to the machine: From the rear frame bars 22 and 23 extend a series of brackets 156 which support a transverse rock shaft 157 in spaced parallel relation to said frame bars. This shaft is provided with an upstanding actuating lever 158 within the operator's reach, and carries two or more quadrants 159, the periphery of the latter being longitudinally grooved, and to their upper ends being attached a depending chain 160.

Fig. 12 shows the cultivator attachment, the same comprising a beam 161 carrying the shovels 163 and having the usual arched bar 162 for clearing the rows of corn or other growing plants. This is a conventional cultivator unit and is attached to the machine by a draw bar 164 extending forward to the front frame bar 23 to which it is secured by a double swivel 165 to allow vertical and lateral movement of the cultivator unit, the same being supported at its rear end by the chains 160, and whereby it may also be raised to clear the ground upon operating the hand lever 158. Upon swinging the hand lever back, the chains 160 wrap on the quadrant periphery 159, seating in the groove thereof. By means of the quadrant, the chains remain in vertical position at any height, thereby relieving the cultivator unit of all strain.

Fig. 13 illustrates the plow attachment, the plow beam 167 carrying the blades 166 being suspended at its rear end by the chains 160. The front end of the plow beam is supported by one of a pair of brackets 168 fastened at their upper ends to the opposite faces of the frame bars 27 and 28. These brackets have vertical reinforcing angle bars 169 at their rear edges, and at the bottom carry a horizontal swivel member 170 to which is pivoted a vertically swinging clevis 171 connected to the front end of the plow beam, whereby the latter may be swung vertically and also horizontally.

To adapt the machine for a seeding attachment, other parts are added as shown in Fig. 14. On the shaft 60 is mounted, at any convenient place, a sprocket wheel 173. The chain 174 connects this sprocket wheel with a sprocket wheel 175 mounted on an auxiliary cross shaft 176. The inner end of this shaft is journaled in a bearing arm 177 extending inwardly of the front frame bar 23, and the outer end of the shaft is journaled in a bearing 178 on a plate 179 secured at the forward end of the frame bar 23 on the outer face thereof. A similar plate 180, secured to the front frame bar 23, meets the plate 179 edge to edge at a right angle. That portion of the shaft 176 which projects from the bearing 178 is provided with a pulley 182 from which a belt 183 runs down to a pulley 184 on the shaft 185 of the seeding attachment, the seed box being shown at 186. One end of the seed box is supported by the plate 180, and a similar plate 180ª at the opposite side of the frame supports the corresponding end of the seed box. It will be noted from Fig. 14 that for the seeding attachment the frame is extended laterally to its full limit to accommodate the seed box.

Fig. 15 shows a grain binding attachment. It will be noted that a belt 187 drops down from the pulley 182 to a pulley 188 mounted on a shaft 189 projecting from the plate 179, the plate being here provided with a boss 190 having a reduced portion on which is pivotally hung a grain binder bracket 191 of the conventional type, a similar bracket being mounted on the opposite side of the machine. Fast on the shaft 189 and behind the pulley 188, is another pulley 192 from which a belt 192ª runs down to a pulley 193 which is a part of the binding device. The belt 192ª is provided for the reason that the binder bracket is designed to swing off the ground to dotted position when desired, thus drawing the pulley 193 and the belt 192ª with it, while said parts are in operation.

The binder bracket 191 may be raised or lowered by the operator as follows: On one end of the shaft 157 is fixed a rocker arm 194. A rod or cable 195 extends from the outer end of this arm to the lower part of the corresponding frame plate 179. A small plate 196 spaced by a solid block 197 is secured on the outer face of the plate 179, and these two plates support a short lever 198 arranged to swing in a vertical plane, the rod or cable 195 being secured to the upper end thereof. The lower section of the lever 198 engages an abutment 199 extending back of the binder bracket 191. When the lever 198 is in the position shown in Fig. 15, the binder bracket is in lowered position, and upon drawing said lever back to the dotted position shown it bears on the abutment 199 and swings the latter upward as shown dotted in Fig. 15.

It will be evident that various other structural details, such as toothed segments for locking the swinging levers, and various other accessories and controlling means for the engine will be provided, and as these form no part of the present invention they have not been illustrated.

With the structure described, any farm implement in use at the present time may be attached to the machine in quick and easy manner, and the fact that the machine is able to cover a large area permits a plurality of implements to be attached for simultaneous use, thus saving time and labor. Upon widening the machine to its limit two cultivator units may be applied The height of the machine is such that it clears the corn or other growing crops across which it is driven. In regard to binders, seeders, and the like, which may be in different lengths, the machine will readily adapt itself to any length by reason of its lateral adjustment.

I claim:

1. The combination with a differential drive gear, the shaft sections driven thereby, and elements driven by the respective shaft sections; of clutch devices between said elements and the respective shaft sections, and clutch devices between the master driving element of the gear and the respective shaft sections.

2. The combination with a differential drive gear, the shaft sections driven thereby, and elements driven by the respective shaft sections; of clutch devices between said elements and the respective shaft sections, clutch devices between the master driving element of the gear and the respective shaft sections, an operative connection between one of the first and one of the second mentioned clutch devices, and an operative connection between the other ones of said first and second mentioned clutch devices.

3. In a tractor, a frame comprising laterally adjustable sections, traction wheels carried by the respective frame sections, a hollow sectional shaft carried by one of the frame sections and having one of its sections operatively connected to the traction wheel of said frame section, a drive shaft carried by the other frame section and operatively connected to the traction wheel of said frame section, said shaft being telescopically mounted in the other section of the hollow drive shaft and rotatable therewith, and a differential drive gearing for the hollow shaft sections.

4. In a tractor, a frame, traction wheels carrying the frame, a sectional drive shaft, a differential gear for said shaft, driving means between the shaft sections and the respective traction wheels, clutch members on the master driving element of the differential gear, and coöperating clutch members on the respective shaft sections.

5. In a tractor, a frame, traction wheels carrying the frame, a sectional drive shaft, a differential gear for said shaft, driving means between the shaft sections and the respective traction wheels, clutch devices between the driving means and the respective shaft sections, and clutch devices between the master driving element of the differential gear and the respective shaft sections.

6. In a tractor, a frame, traction wheels carrying the frame, a sectional drive shaft, a differential gear for said shaft, driving means between the shaft sections and the respective traction wheels, clutch devices between the driving means and the respective shaft sections, clutch devices between the master driving element of the differential gear and the respective shaft sections, an operative connection between one of the first and one of the second mentioned clutch devices, and on operative connection between the other ones of said first and second mentioned clutch devices.

In testimony whereof I affix my signature in presence of two witnesses.

CHARLES E. BORING.

Witnesses:
 SADIE F. PEVNY,
 H. G. BATCHELOR.